Nov. 30 1943.                    H. P. ELLIOTT                    2,335,498
                              ADDRESSING MACHINE
                              Filed May 7, 1940                7 Sheets-Sheet 1

Inventor,
Harmon P. Elliott

Nov. 30 1943.   H. P. ELLIOTT   2,335,498
ADDRESSING MACHINE
Filed May 7, 1940   7 Sheets-Sheet 3

Nov. 30 1943.  H. P. ELLIOTT  2,335,498
ADDRESSING MACHINE
Filed May 7, 1940  7 Sheets-Sheet 6

Inventor.
Harmon P. Elliott

Patented Nov. 30, 1943

2,335,498

UNITED STATES PATENT OFFICE 2,335,498

ADDRESSING MACHINE

Harmon Parker Elliott, Watertown, Mass.

Application May 7, 1940, Serial No. 333,810

27 Claims. (Cl. 270—1)

This invention relates to addressing machines, and as illustrated herein, relates more particularly to machines for addressing bills, particularly tax bills, and duplicates thereof.

One of the objects of the present invention is to provide an addressing machine capable of delivering a tax bill and duplicates detachably secured together in superimposed relation in book form, each tax bill and each duplicate in a book having thereon the same address.

The tax bill and duplicates also have duplicate printed matter and superimposed spaces for receiving manually applied data. The tax bill and all duplicates except the last each also can have carbon deposited on their under faces under the location of the manually applied data and over the location of the manually applied data on the next lower or duplicate bill so that a duplicate copy of the data is applied to the duplicate or lower bills at the same time that it is applied to the original or upper tax bill.

Another object of the invention is to provide an improved holder arranged to support a plurality of stacks of articles such as tax bills. To this end, the machine is provided with a bill holder which, as illustrated, is arranged to receive three stacks of tax bills and the bill holder is so arranged that bills are removed from the top of each successive stack in such a manner that two duplicate bills are first removed from the two stacks and then the original bill is removed from the third stack. These successive bills are then moved successively into printing position.

A further object of the invention is to provide improved means for feeding or withdrawing the bills from the holder and for feeding the successive bills to printing position.

A yet further object of the invention is an addressing machine having provision for feeding individual sheets successively from a plurality of collections of such sheets, for applying the same address, repeated if desired, to each of a plurality of sheets, and for detachably combining all sheets having the same address in superimposed order in book form with similar parts of the several sheets in alignment.

Another object of the invention is to improve generally the construction and operation of addressing machines.

With the above and other objects and features in view, the invention will now be described with reference to the accompanying drawings which illustrate a preferred embodiment of the invention and in which:

Fig. 7 is a detailed view in end elevation of the bill combining and perforating mechanism;

Fig. 8 is a view in section taken along the line 8—8 of Fig. 3 illustrating on an enlarged scale the drive mechanism for the combining and perforating mechanism;

Figure 1:
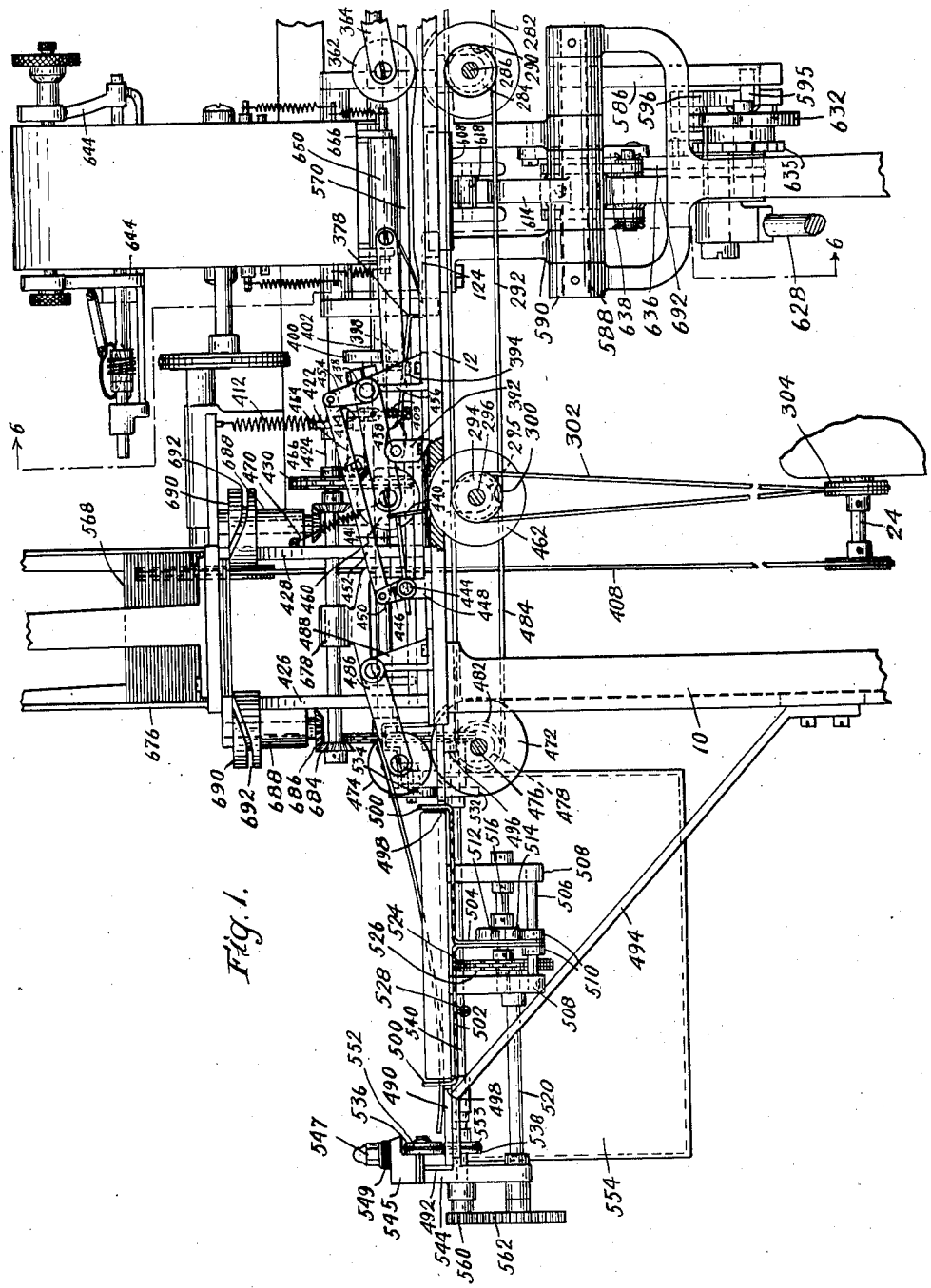
Fig. 1 is a view in front elevation partly in section of the left hand end of the machine.

The present invention is illustrated as embodied in a machine particularly adapted to apply the same address to a plurality of tax bills including original bill and duplicate bills, which, after being addressed, are delivered successively to a holder wherein the duplicate bills and the original bill are collected in superimposed relation to each other with the original bill uppermost. The superimposed bills are then fed to a combining mechanism wherein the superimposed addressed bills are detachably secured together in book form and deposited in a receiving holder from which the combined tax bills may be removed by the operator as desired.

The illustrated machine comprises a frame 10 on which is supported a horizontal machine bed or table 12. The lower portion of the frame 10 is provided with horizontal supporting bars 14 which are arranged to support a power plant 16, Fig. 6, of well-known construction controlled by a treadle 18 which is arranged to effect one complete printing operation following the momentary depression and subsequent release of the treadle 18. The power mechanism 16 is driven by an electric motor 20 connected to a pulley 22 fixed to a shaft 23 rotatable in suitable bearings of the power mechanism frame. The shaft 23 is connected by suitable speed-reduction spur gears 24 and 26 to a shaft 28 by which the various parts of the machine are driven.

Figure 2:
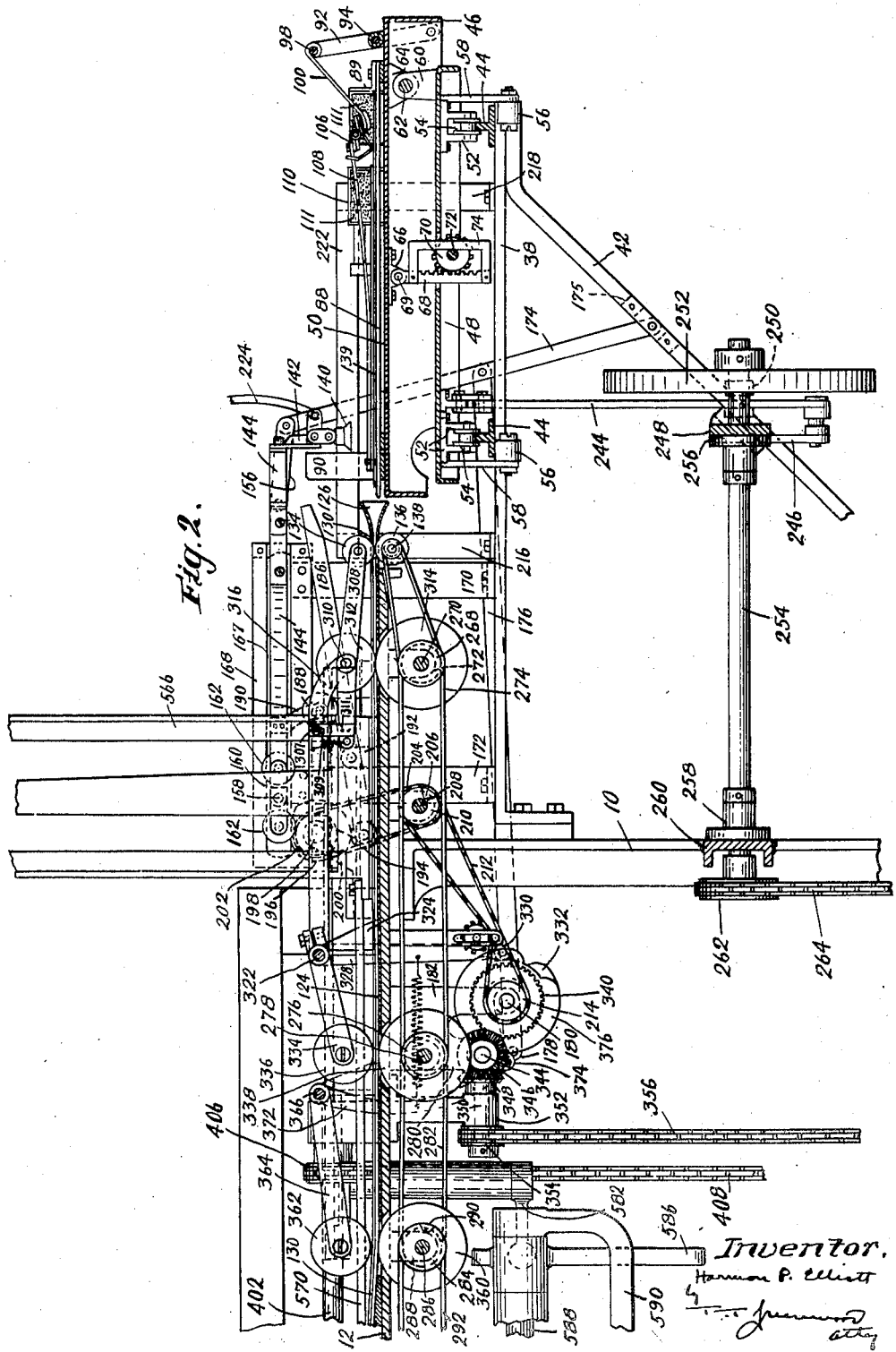
Fig. 2 is a view similar to Fig. 1 of the right hand end of the machine.
Figure 4:
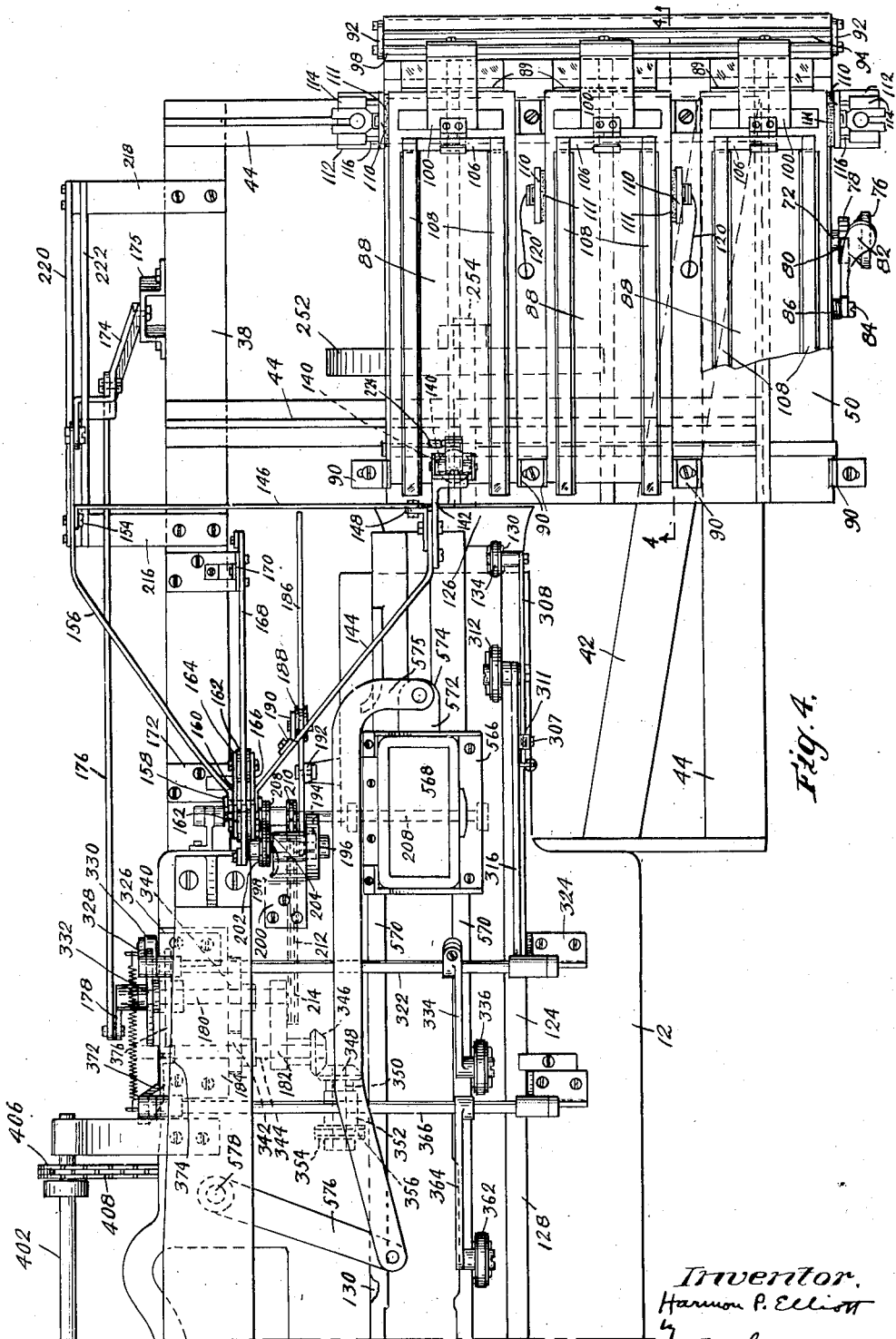
Fig. 4 is a plan view of the right hand end of the machine.
Figure 5:
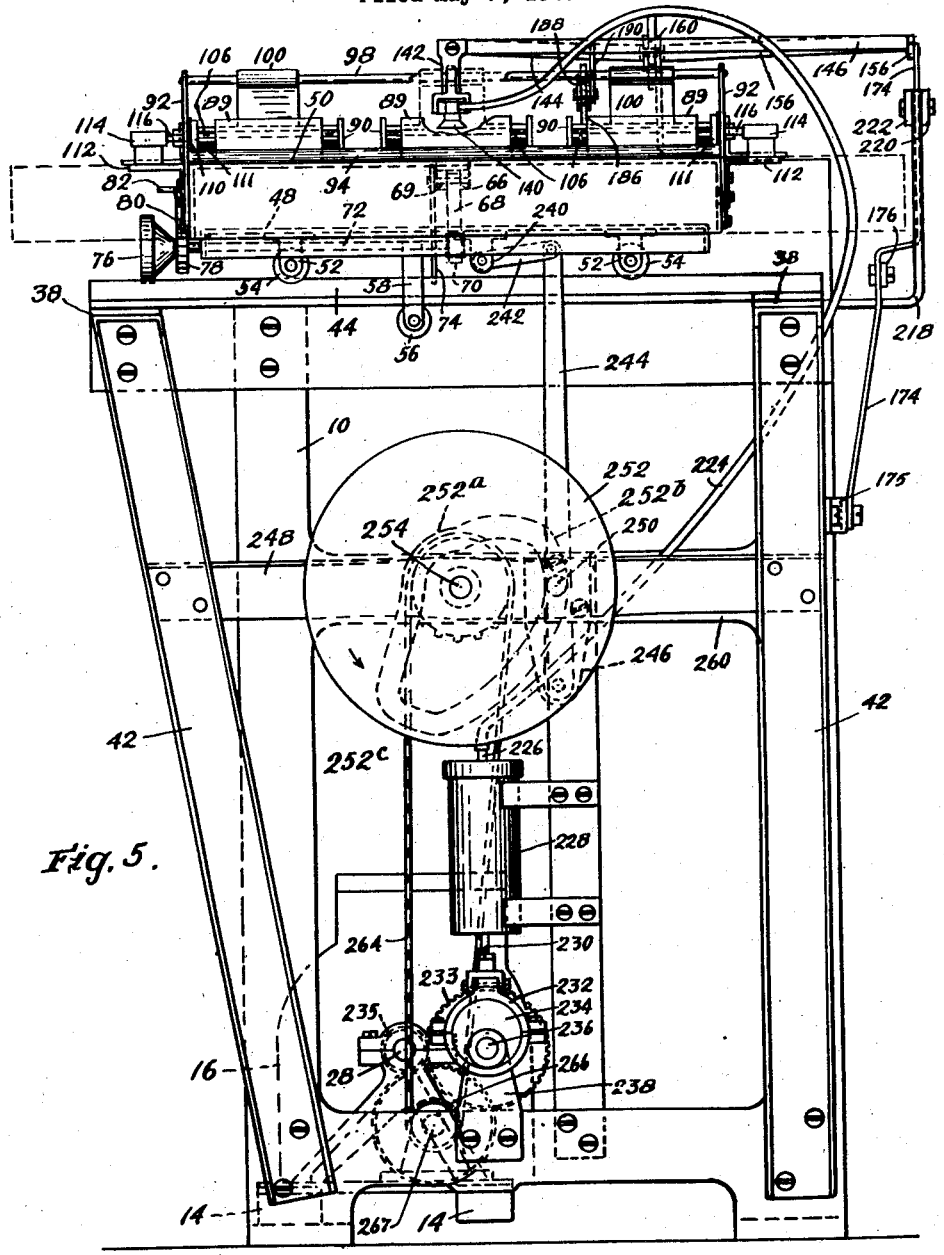
Fig. 5 is a view in elevation of the right hand end of the machine.

The right hand end of the machine, see Figs. 2, 4, and 5, under the bed or table 12, has a pair of horizontal parallel bars 38 extended from and secured to the machine frame to support a bill sheet carriage, the free ends of the bars being fixed to the upper ends of brace bars 42, the lower ends of which are fixed to the bottom part of the end frame members of the machine. Said bars 38 support and have fixed thereto the end parts of forwardly and rearwardly extending spaced parallel tracks 44 constituting a support for a bill or sheet holder 46 which includes a carriage 48 and a tax bill supporting table 50. The carriage 48 is provided at its under side with downwardly extending brackets 52 which are arranged to receive flanged wheels 54 riding on the tracks 44. The underside of the table is also provided with retaining rollers 56 which underlie and are arranged to engage the under side of the tracks 44 to prevent the holder 46 from being accidentally removed from the tracks 44. The rollers 56 are rotatably carried by the lower ends of downwardly extending brackets 58 fixed to the lower surface of the carriage 48.

The right hand end of the carriage 48 adjacent to its front and rear edge portions is provided with upwardly extended brackets 60 connected by horizontal hinge pins 62 to ears 64 carried by and depending from the right hand part of the bill supporting table 50. By this construction the left hand end of the table 50 may be raised or lowered to position the tops of the bill stacks on the table at the proper delivery level.

In order to adjust the vertical position of the bill supporting table 50 there is fixed adjacent the middle portion thereof, and on the under face thereof, a downwardly extending bracket 66 which is pivotally connected to a substantially vertically depending rack 68 by a pin 69. The rack 68 meshes with a spur gear 70 which is fixed to a rearwardly extending horizontal shaft 72 mounted in suitable brackets secured to the lower surface of the carriage 48. The rack 68 is maintained in engagement with the spur gear 70 by a U-shaped frame member 74 which closely confronts the side of the shaft 72 on the side opposite the rack 68 and which is connected at its ends to the rack. The shaft 72 at its forward end, is provided with a knurled adjusting knob 76 (Fig. 4) which is fixed thereto and which has fixed thereto a ratchet wheel 78 arranged to be engaged by a pawl member 80 mounted on a finger piece 82 which in turn is pivotally secured to the front of the member 48 by a pivot screw 84. The pawl 80 and the finger piece 82 are normally urged into engagement with the pawl 78 by a spring 86. The teeth on the ratchet wheel 78 are so arranged that rotation of the shaft 72 in a counter-clockwise direction as viewed in Fig. 2 by the weight of the table and the bills thereon is prevented. The left hand end of the table can be raised from time to time to keep the tops of the bill stacks at approximately a constant level by sufficient rotation of the knob in a clockwise direction. Re-setting of the table to its lowermost position is effected by raising the pawl and turning, or permitting the turning of, the knob in the opposite direction.

As illustrated especially in Figs. 2, 4, 5, and 11 the table is provided with three shelves 88 each adapted to support a bill or sheet stack and each having a vertical end plate 89 and vertical side plates 90 which define the positions of the stacks. The right hand end of the table 50 has pivotally secured thereto front and rear links 92 which are fixed at their lower ends to the front and rear edges of the table 50 and which support between them, at substantially their middle portions, a roll 94, which, as shown in Figs. 2 and 5, bears loosely upon the top face of the table 50. The upper ends of the links 92 are connected by a substantially horizontal extending rod 98. The rod 98 carries three inclined flat members 100 formed of relatively wide flat metal sheets and having a curved right hand upper end which loosely encircles the rod 98. The lower left hand end of each of the plates 100 has hinged thereto a substantially horizontal forwardly and rearwardly extending plate 106. The plate 106 at its front and rear ends carries thereon approximately flat spring members 108 which extend toward the left and over the associated bill stack and bear yieldingly on the tops of the stack while permitting the topmost bill to be withdrawn toward the left.

The bill shelves 88 are also provided (as shown most clearly in Fig. 4) with means for engaging an edge of the bills to prevent displacement of the lower bills when the uppermost one is being removed from the top of each stack. To this end the front and rear sections 88 are each provided with a member 110, which at its bill-engaging face is provided with a soft rubber or the like friction pad 111 which bears against the edges of the bills of the stack and exerts sufficient frictional drag thereon to prevent removal of a lower bill when the uppermost bill is withdrawn. The member 110 is mounted in a bracket 112 having upwardly extended bosses 114, Figs. 4 and 5, which are arranged to receive rods 116 fixed to the member 110. The upwardly projecting bosses 114 receive springs (not shown) which engage the ends of the rods 116 and thus force the member 110 against the edge of the stack of bars in the holder.

The intermediate section 88 is provided with two retaining or friction members 118 which are arranged to engage the opposite edges of the bill stack on the intermediate holder. Each member 118 is supported on the free end of a spring strip 120 the other end of which is suitably fixed to the table, so that the members 118 are urged against the opposite side edges of the bill stack.

The holder 50 is reciprocable on its track 44 and is advanceable from the foremost position illustrated in Fig. 4 toward the rear of the machine in a step by step manner, by mechanism hereinafter to be explained, to position each bill stack momentarily stationary in front of and aligned with the flared end or entrance 126 of a tubular bill guideway 124. The left hand end portion of the flared entrance part 126 is cut out as indicated at 130 to receive the lower part of an idler roll 134 which is arranged to cooperate with an underlying driven feed roll 136 fixed to a shaft 138 mounted in suitable bearings fixed to the under side of the bed 12 of the machine and extending beyond the right hand edge of the bed 12 and slightly thereabove to engage a tax bill 139 to feed the tax bill toward the left to the addressing mechanism, as will later be described.

A pneumatic feeding device consisting of a suction cup 140 is mounted for movement adjacent to the left hand end of the tax bill holder 50. Said cup is pivotally mounted on the lower end of a downwardly extending arm or bracket 142 which is fixed to the right hand end of a bar 144 (Figs. 2 and 4) which forms a part of a frame for reciprocating the suction cup 140 horizontally toward and away from the bill guideway and also toward and away from the bill table. Said frame also includes a forwardly and rearwardly extending substantially horizontal member 146 which is connected at its forward end to the member 142 by an angle iron 148 fixed suitably to each of these members. The rear end of the bar 146 is fixed by a suitable bolt 154 to a substantially horizontal bar 156. The left hand ends of the bars 144 and 156 are convergent and are pivotally secured by a suitable pin 158 to a carriage 160. The carriage 160 is provided with a pair of flanged wheels 162 which are rotatably mounted between bars 164, 166 of the carriage 160. The flanged wheels 162 are arranged to move in a track formed as a horizontal slot 167 in a plate 168 which is supported at its right hand end by a bracket 170 fixed by suitable fastenings to the base 10 of the machine. The left hand end of the track is also supported above the bed of the machine by a bracket member 172 suitably fixed to the base of the machine.

The right hand end of the link 156 forming part of the frame carrying the suction cup 140, is pivoted to the upper part of a link 174 the lower part of which is pivotally secured to a bracket 175 carried by the rear diagonal brace 42 (Fig. 4) of the bill carriage support. The middle portion of the link 174 is pivotally connected with the right hand end part of a connecting link 176, the left hand end part of which is pivotally secured to a crank member 178 which is fixed to the rear end of a horizontal shaft 180. The shaft 180 is rotatably mounted in bearings formed in the lower ends of downwardly extending supporting brackets 182 and 184, Figs. 4 and 6, which are fixed in any suitable manner to the under side of the machine bed 12. Thus when the shaft 180 is rotated, the connection 176 is reciprocated thus causing the carriage 160 to be reciprocated in the track 168 which in turn causes reciprocating movement of the pneumatic or suction cup 140.

In order to insure that the pneumatic cup 140 does not engage the topmost bill of a selected bill stack until its movement toward the right has been substantially completed, a supplementary track member 186 is provided on which a flanged wheel 188 is arranged to ride, which wheel 188 is rotatably fixed to a downwardly extending bracket member 190 which is fixed to the right hand end portion of the supporting bar 144 of the suction cup supporting frame. The track member 186 is pivotally supported intermediate its ends in an upstanding bracket 192 fixed to the top surface of the bed 12 of the machine. The left hand end portion of the track member 186 has pivotally secured thereto a cam roll 194 which is arranged to engage an over-lying edge cam 196 fixed to a horizontal shaft 198 rotatable in a bearing formed in the upper end of a substantially vertical bracket 200 fixed to the bed 12 of the machine. The shaft 198 at its rear end is provided with a sprocket wheel 202 which is driven by an endless sprocket chain 204 from a sprocket 206 fixed to a horizontal shaft 208 mounted in suitable bearings secured to the under side of the machine bed 12. The shaft 208 carries, at its forward end, a sprocket wheel 210 which is driven by an endless chain 212 by a sprocket 214 fixed to the forward end of the shaft 180. The various drives have a unity ratio so that the cam shaft 198 rotates at the speed of the shaft 180 and in timed relation therewith. The cam member 196 is so related to the crank 178 fixed to the rear end of the shaft 180 that the low part of the cam 196 is arranged to be brought into engagement with the cam roll 194 at the time that the suction or pneumatic cup 140 is in its extreme right hand position.

The track or bar 186 is thus lowered by the weight of the suction cup supporting frame and the cup is permitted to drop down upon the top bill of whatever bill stack happens to be under the cup at the time. The low portion of the cam 196 is approximately 180° in angular extent so that the cup travels to the left in a low horizontal plane from its feed stroke to move the top bill that it grips into the bill guideway and into the bite of the first feed rolls. The high part of the cam then causes the raising of the frame and the cup so that the return stroke of the cup is in a higher plane clear of the bill stacks.

In order to prevent undue movement of the suction cup supporting carriage transversely of its line of reciprocation the rear bar 38 of the machine is provided with rearwardly and upwardly extending bracket members 216 and 218, Figs. 2, 4, and 5, which are fixed in any suitable manner to the top surface of the bed 38. The upper ends of the brackets 216 and 218 have affixed thereto substantially horizontally extending bars 220 and 222 between which the upper part of the link 174 is guided closely.

The interior of the suction cup 140 is connected to a flexible tube 224, which at its lower end is connected to a pipe member 226 fixed to the top of a vacuum pump 228 (Fig. 5) which is provided with a piston reciprocated through a connecting rod 230 fixed to an eccentric strap 232. The eccentric strap 232 surrounds an eccentric 234 which is fixed to a jack shaft 236 mounted in suitable bearings formed in the upper end of vertical bracket members 238. The eccentric shaft 234, see Figs. 5 and 6, has a gear 233 fixed thereto which meshes with a gear 235 fixed to the shaft 28 of the power plant, the gear ratio being such that suction is on the suction cup at the time it is lowered into engagement with the top bill of a stack and the suction is not released until the bill is in its proper position in the bill guideway. The suction pump and its operating mechanism are well known in the prior art and need not be described in detail herein.

To this end the bill support is moved by these successive steps from the rear to the front of the machine, or from the right to the left, Fig. 5, with intervening stops at which the three bill stacks are positioned in line with the bill guideway and then is returned to the extreme rear position in one continuous movement. The extreme rear and the middle bill stacks consist of duplicate bills while the front bill stack consists of original bills. The duplicates are fed first and then an original bill is fed. As the arrangement is such that the successive addressed bills are collected one on top of the other, this arrangement brings the original bill uppermost, which is desired.

For this purpose the carriage 48 is provided at its under surface with a downwardly extending bracket member 240 which is fixed thereto in any suitable manner. The lower end of the bracket member 240 is pivotally secured to the forward end of a link 242, which, at its rear end, is pivotally secured to the upper end of a substantially vertically extending cam lever 244, see Figs. 2, 4, and 5. The cam lever 244 is pivotally secured to the lower end of a bracket 246 which is fixed to a substantially horizontal cross bar 248 supported by the diagonal members 42. The cam lever 244 at its lower end portion is provided with a cam roll 250 which is received in a cam groove formed in the left hand face of a cam 252 which is fixed to the right hand end of a horizontal shaft 254. Said shaft 254 is supported adjacent to its right hand end portion in a bearing member 256 which is fixed to the cross bar 248. The right hand end of the shaft is supported in a similar bearing 258 which is secured to a horizontal cross bar 260 fixed to the end frame 10 of the machine. The shaft 254 at its left hand end, Fig. 2, has secured thereto a sprocket 262 which is driven by an endless chain 264 from a sprocket 266 fixed to a shaft 267 driven through reduction gearing 268 from the shaft 28 of the power plant, the gearing being such that the cam 252 rotates synchronously with the movements of the vacuum cup 140 and other parts of the machine. The cam groove in the cam member 252 is so designed that it is provided with three dwell portions 252a, 252b, and 252c corresponding to the positions of the successive bill stacks in register with the bill guideway and which permit the bill holder to remain stationary for a suitable period of time in said positions, the cam groove also having lifter portions intermediate the dwell portions by which the shifting of the bill holder from one to another stack position and the final return of the holder to an initial position is effected.

As previously stated, the feed roll 136 is continuously rotated and is arranged to engage successive tax bills to feed them toward the left as shown for example, in Figs. 1 and 2. The shaft 138, which carries the feed roll 136, is belt driven from a pulley 268 fixed to the forward end of a shaft 270 which is mounted in suitable bearings formed in downwardly extending brackets 272 fixed to the under side of the machine bed 12. The shaft 270 in turn is rotated by a belt 274 by a pulley 276 which is likewise fixed to a substantially horizontal shaft 278 which is mounted for rotation in bearings formed in the lowermost end of a suitable bracket member 280 fixed to the lower surface of the machine bed 12. The shaft 278 in turn is driven by an endless belt 282 from a pulley 284 fixed to the forward end of the substantially horizontal shaft 286 which is rotatably mounted in suitable brackets 288 fixed to the under surface of the machine bed 12. The shaft 286 in turn has fixed thereto a pulley 290 which is driven by an endless belt 292 by a pulley 294, Fig. 1, fixed to a shaft 296 mounted in bearings formed in the lower ends of suitable brackets 295 fixed to the face of the machine bed 12. The rear end of the shaft 296 carries a pulley 300 which is driven by an endless belt 302 from a pulley 304 fixed to the continuously rotating shaft 24 of the power mechanism. The various shafts 138, 270, 278, 284 and 296 are thus continuously rotated during the operation of the machine. Each of these shafts has mounted thereon suitable feed wheels which will later be described.

The forward end of a tax bill is fed toward the left, Fig. 2, by the cooperating feed rolls 134 and 136 when the roll 134 is moved downwardly into engagement with the top surface of the tax bill on the roll 136. The roll 134 is rotatably mounted in the right hand end of a vertically yieldable lever 308 (Figs. 2 and 4) which is pivotally carried intermediate its ends by a substantially horizontal shaft or journal pin 310 carrying a roll 312 which is rotatably mounted thereon and cooperates with a feed roll 314 fixed to the shaft 270. The shaft or pin 310 is carried on the right hand end portion of an arm 316 which is arranged to be oscillated vertically and will later be described.

The left hand end of the roll carrying lever 308 has a spiral tension spring connected between the lever and the arm 316 to urge the roll 134 downward.

Movement of the lever 308 is restricted by a screw 307 of the arm 316 which is located loosely in a short vertical slot 309 of a vertical plate 311 attached to the lever 308. The roll 134 needs only a small amount of vertical movement in order to permit both the rolls 134 and 312 to be effective in driving the bill sheet. The left hand end of the arm 316 is fixed to a rearwardly and forwardly extending horizontal shaft 322 which is rotatably mounted in bearings 324, 326 fixed to the front and rear portions of the machine bed 12. The rear end of the shaft 322 has fixed thereto a depending cam lever 328 which carries at its lower end a cam roll 330 which is arranged to engage an edge cam 332 fixed to the crank shaft 180.

Said cam thus raises and lowers the rolls 134 and 312 and controls the advance of the bill sheet by said rolls. The cam is provided with a peripheral dwell portion of considerable angular extent and a short recessed or active portion. Thus, the feed rolls are held in an upper inactive position for the greater part of the rotation of the cam, during which time a bill sheet can be withdrawn from a bill stack and presented to the rolls, and the rolls are in lowered position for a sufficient period of time to advance the bill out of engagement therewith.

The feed-roll controlling shaft 322 also has fixed thereto an arm 334 which extends downwardly and toward the left and at its left hand end portion has pivotally secured thereto a roll 336 which is arranged to cooperate with a constantly rotating feed roll 338 fixed at the shaft 278. Thus, when the rolls 134 and 312 are in operative down position, the roll 336 is in inoperative up position and vice versa. Thus, the rolls act in succession on the bill. The horizontal spacing between the rolls 312 and 336 is somewhat less than the length of the bill sheet so that the bill is delivered from the roll 312 into the open bite of the roll 336 and stays stationary there until the roll 336 descends and advances the bill beyond the roll and against a bill stop and into first addressing position as will be presently explained. This method of operating the rolls in succession results in but one pair of cooperating feed rolls being in driving engagement with the bill at a time and eliminates possible difficulties involved in feeding the bill by two sets of rolls that may have slightly different feeding speeds.

Figure 6:
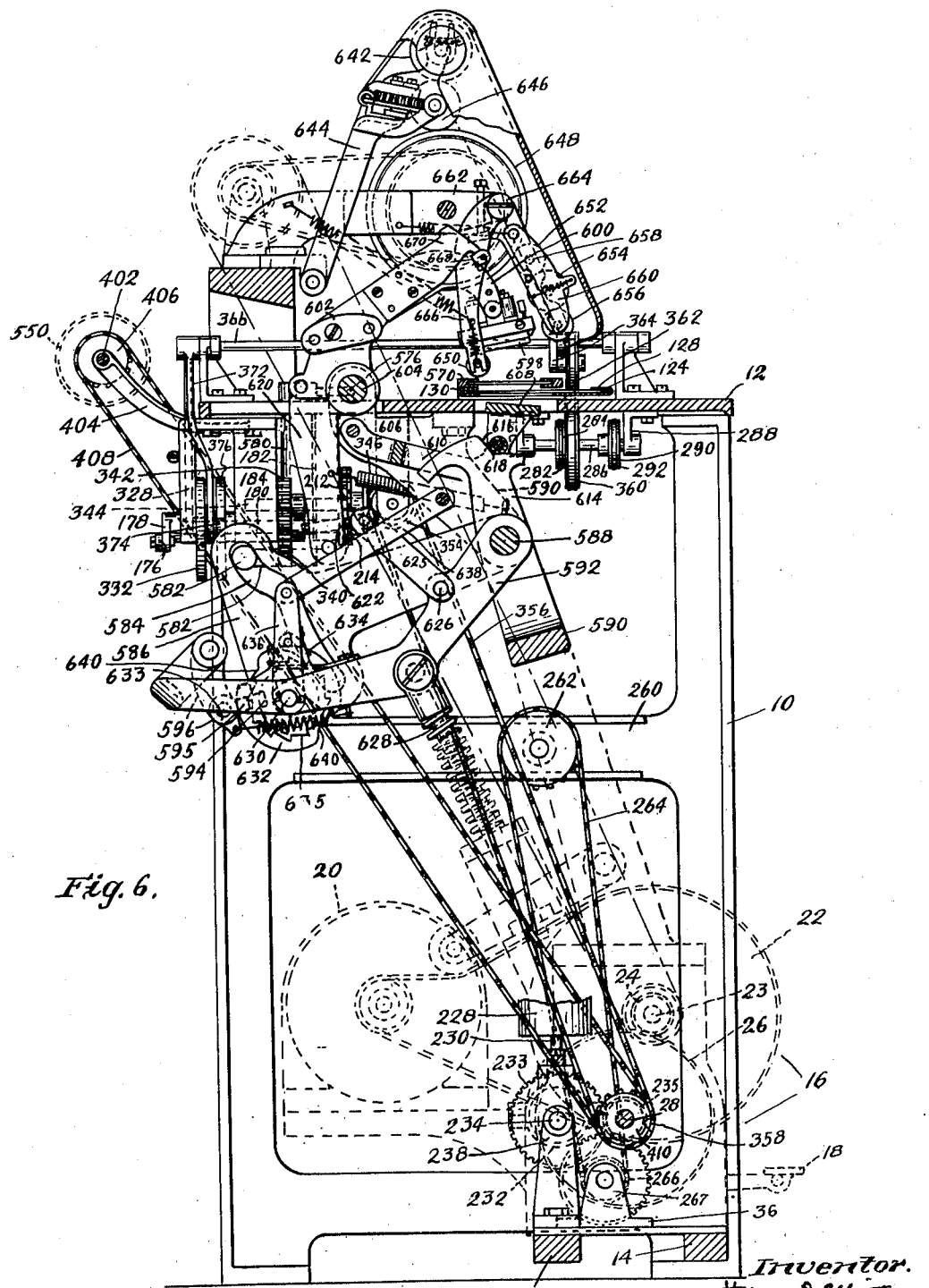
Fig. 6 is a view in section taken along the line 6—6 of Fig. 1.

The crank shaft 180 has a spur gear 340 fixed thereto, Figs. 2 and 6, which meshes with a smaller spur gear 342 fixed to a shaft 344 which is journalled in suitable bearings formed in the bracket members 182 and 184. The forward end of the shaft 344 has fixed thereto a bevelled gear 346 which in turn meshes with a bevelled gear 248 fixed to the right hand end of a horizontal shaft 350. Said shaft 350 is rotatably mounted in a bearing formed in a lower end of a downwardly extending bracket member 352 which is fixed by any suitable means to the lower surface of the machine bed 12. The left hand end of said shaft 350 has fixed thereto a sprocket wheel 354 which is driven by an endless chain 356 from a sprocket wheel 358 fixed to the shaft 28 of the power mechanism 16 of the machine. Thus the shaft 180 is rotated in timed relation to the other operating parts of the machine to insure the proper timed operation of the parts.

The shaft 286 has fixed thereto a feed roll 360 which projects through an opening formed in the machine bed 12 and is arranged to engage a tax bill. A cooperating presser roll 362 is rotatably mounted on the left hand end of an arm 364 which is fixed to a shaft 366 rotatably mounted in suitable bearings 368 and 370 fixed to the front and rear portions of the machine bed 12. The shaft 366 at its rearward end has fixed thereto a depending cam lever 372 which carries at its lower end a cam roll 374 arranged to engage an edge cam 376 fixed to the rear portion of the crank shaft 180.

The cam member 376 has an angularly long dwell portion which holds the roll 362 in raised inoperative position and a short depressed or active position which permits the roll to be maintained in lowered operative position. This roll 362 and its cooperating power-driven roll 360 operate after the first addressing operation has been performed to advance the bill sheet by the distance between successive address portions on the bill to the second address position and against a second stop as will be presently described.

Figure 12:
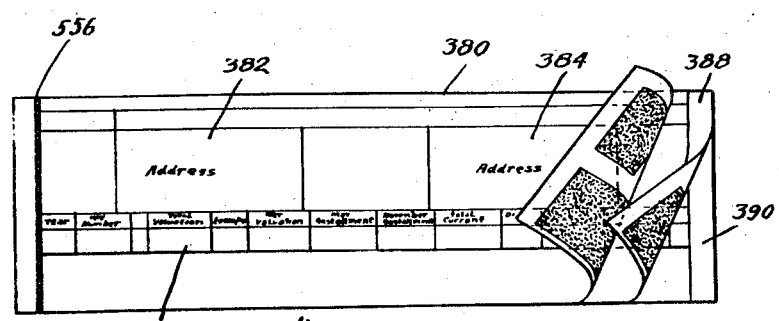
Fig. 12 is a view illustrating a book made up of combined tax bill and duplicates forming the product of the present machine.

The tax bill 380, as shown most clearly in Fig. 12, includes two address bearing spaces 382 and 384 which are spaced longitudinally of the bill sheet and each of which, as well as all duplicates of any one original bill receives the same address. For a booklet of one original and two duplicate bills the same address will appear six times in the booklet. The tax bill also includes spaces 386 for receiving data descriptive of the property to be taxed as well as the total amount of tax and the like. The duplicate tax bills 388 and 390 also have spaces which underlie the spaces 382, 384, and 386 of the original tax bill 380.

Figure 3:
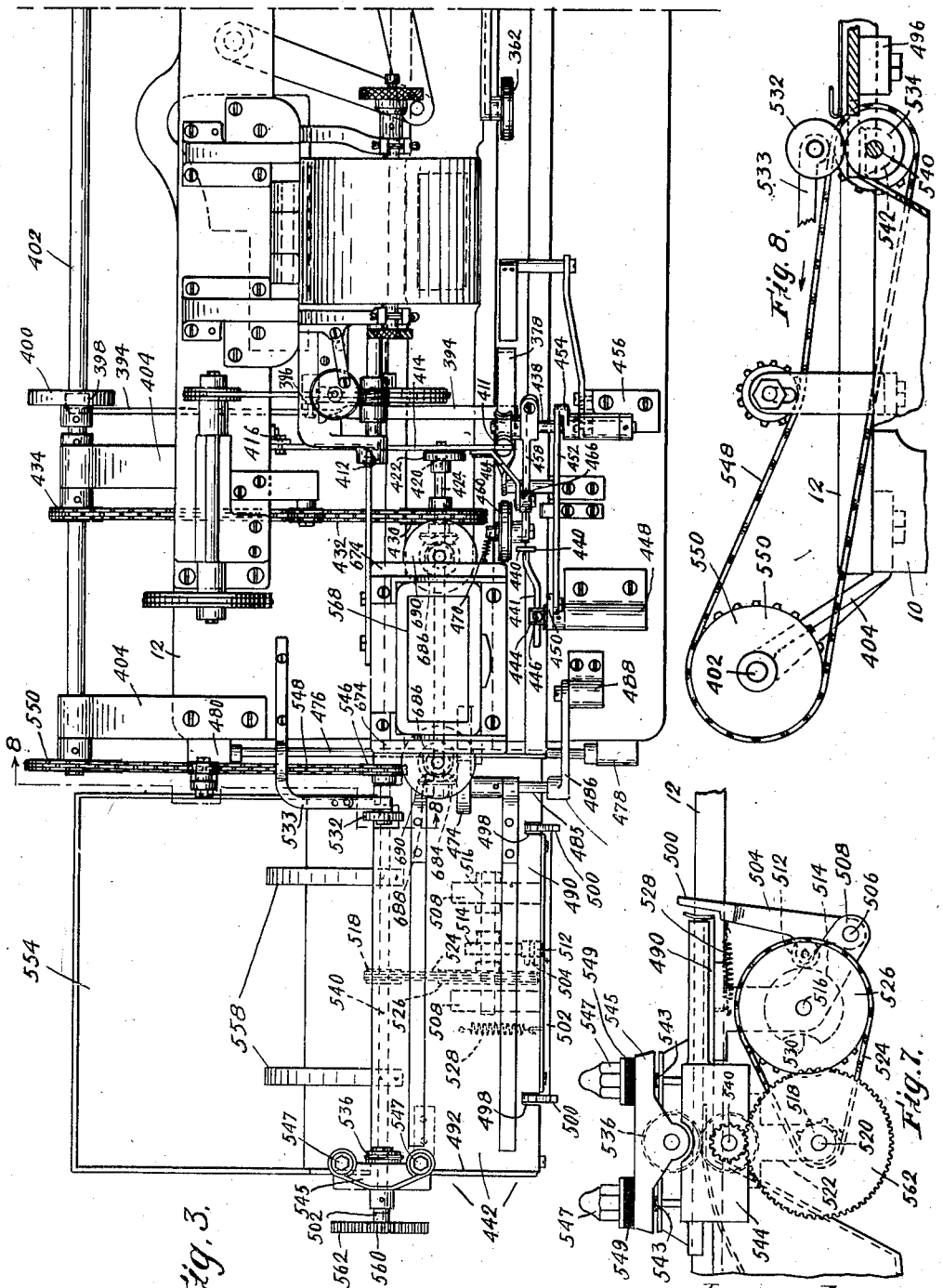
Fig. 3 is a plan view of the left hand end of the machine.
Figures 9, 10:
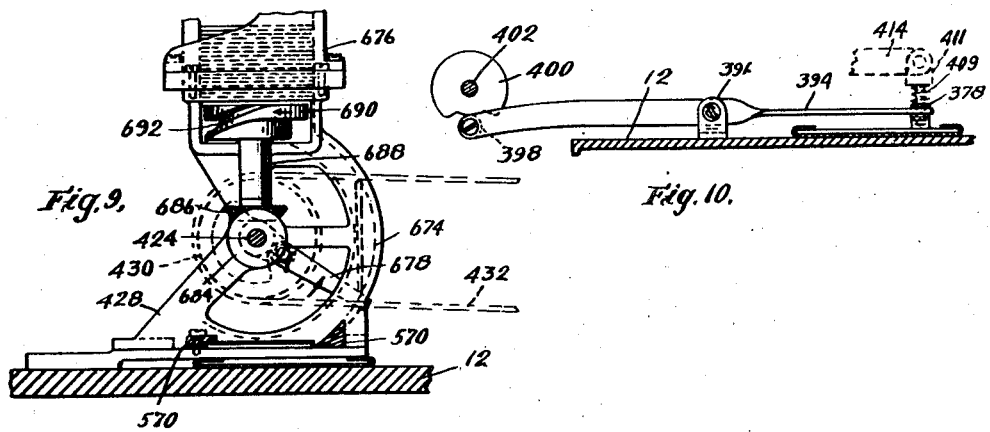
Fig. 9 is a view in elevation on a somewhat enlarged scale over Fig. 1 of the mechanism for removing the stencils from the end of the stencil track and for raising the stencils to the bottom of a stencil receiving holder.
Fig. 10 is a detailed view illustrating mechanism for raising and lowering the bill stop mechanism.
Figure 11:
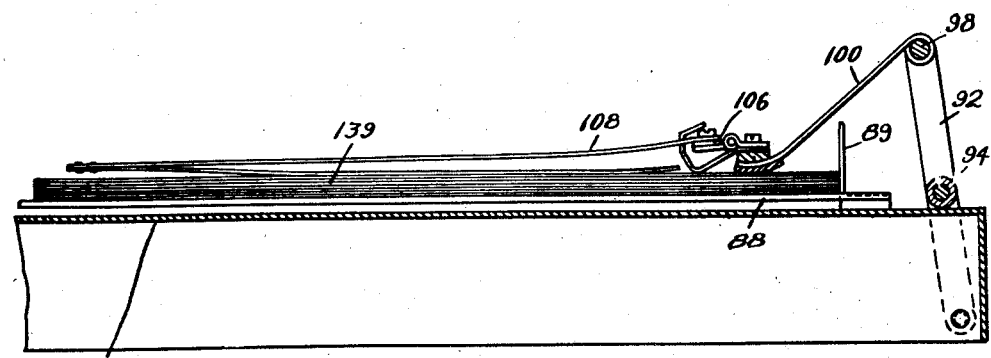
Fig. 11 is a detailed view taken along line 11—11 of Fig. 4 on a somewhat enlarged scale of the mechanism associated with each bill stack for maintaining the bills in a flat horizontal position in the bill receiving holder.

The stop member 378, see Figs. 1, 3, and 10, is provided that positions the tax bill in the first adding positions by engaging the forward edge of the bill to hold the bill against further advance in a position to receive an address in the space 382. Said stop member 378 is pivotally secured at its left hand end to a vertical bracket 392 carried by and rising from the top surface of the table or machine bed 12. The stop member 378 at about its mid portion is engaged by the forward end of a cam lever 394 which is pivotally secured intermediate its ends to an upstanding bracket 396 which is fixed to the bed 12 of the machine. The rear end portion of the cam lever 394 carries thereon a cam roll 398 which underlies and is arranged to engage a cam member 400 fixed to a horizontal shaft 402 which is located, as shown most clearly in Fig. 3, at the rear of the machine and is supported in bearings formed in rearwardly extending brackets 404 fixed to the bed 12 of the machine. The shaft 402 near its right hand end, Fig. 2, has fixed thereto a sprocket wheel 406 which is driven by an endless chain 408 from a sprocket 410 fixed to the jack shaft 28 of the machine, see also Fig. 6. Thus, when the shaft 402 is rotated, the cam member 400 fixed thereto causes the forward end of the cam lever 394 to move up and down thus raising and lowering the stop member 378 from and into the path of advance of a bill sheet. The cam roll 398 is normally urged against the cam member 400 by a tension spring 412, Figs. 1 and 3.

The stop member 378 is pressed yieldingly against the cam-operated lever 394 by a compression spring 409, Fig. 10, which encircles a guide rod 411 passed loosely through the stop member and lever and carried by a cylindrical yoke 413 pivotally connected to the forward end of a cam lever 414. Said lever 414 is pivotally supported at its rear end by a bracket 416. The cam lever 414 intermediate its ends carries a cam roll 420 which engages the under side of a cam member 422 fixed on the right hand end of a horizontal shaft 424 which is located above the machine bed and is rotatably mounted in suitable bearings formed in upwardly extending brackets 426, 428 fixed to the top of the machine bed 12. Said shaft operates the stencil elevating mechanism as will be explained hereinafter. The shaft 424 is provided with a sprocket wheel 430 and is driven by an endless chain 432 from a sprocket wheel 434 fixed to the horizontal shaft 402. After the first addressing operation has been performed and the stop member 378 is moved upwardly out of stop position, the cooperating feeding roll 362 moves downwardly and engages the tax bill and advances it until the leading edge of the tax bill engages a second stop member 440 mounted just to the left of the upper vertically movable feed roll 398, Figs. 1 and 3, at which time the bill passes out of engagement with the roll 362. This positions the tax bill with its address receiving portion 384 just below the addressing mechanism and a second address is printed on the tax bill at the region 384, Fig. 12. After the second addressing operation has been completed, the stop member 440 is moved upwardly to permit the tax bill to be moved out of printing position and into the work receiving holder 442.

The stop member 440 has a supporting rod 441 extended to the left thereof that is adjustably secured in and crosswise of the rear end portion of the shaft 444 by a set screw 446 screw-threaded in the shaft. The shaft 444 is rotatable in a suitable bearing formed in the upper end portion of a vertical bracket 448 which is fixed to the top surface of the machine bed 12 by suitable fastenings. The shaft 444 also has fixed thereto a crank arm 450, which at its upper end is pivotally secured to the left hand end of a link 452. The right hand end of the link 452 is pivotally secured to an upstanding crank arm 454 which is fixed to the shaft 438 hereinbefore referred to. The shaft 438 is rotatably mounted in a suitable bearing formed in the upper end portion of a bracket 456 fixed to the top surface of the machine bed 12. The shaft 438 has fixed thereto an arm 458 which extends downwardly and to the left and at its left hand end carries a rotatable wheel 460 which is arranged to cooperate with a feed wheel 462 fixed to the shaft 296.

The cam lever 414 has fixed to its forward end a bent arm 464 which at its left hand forward end carries a cam roll 466 that overlies and engages the wheel carrying arm 458. Thus, when the arm 414 is moved downwardly by the cam member 422, the roll 460 is moved downwardly into feeding engagement with the tax bill which is against the stop 440. This downward movement of the arm 458 also causes the stop member 440 to be moved upwardly thus permitting the free feed of the tax bill toward the left.

The presser roll 469 is normally urged in an upward direction by a tension spring 470, Figs. 1 and 3, fixed at its lower end to the rear end of the shaft carrying the presser roll 469 and at its upper end to the left hand side of the vertical bracket 426.

The tax bill is fed by cooperating rolls 460 and 462 into the bite of a set of continuously operative secondary-feeding or extractor rolls 472 and 474. The feed roll 472 is mounted on a horizontal shaft 476 which is supported at its forward end in a bearing 478 fixed to the under surface of the left hand end of the table 12 and at its rear end is supported in a similar bearing 480. The shaft 476 carries a pulley 482 which is driven by an endless belt 484 from a pulley fixed to the shaft 296. The feed roll 472 is driven continuously at the same rate of peripheral speed as are the other feed rolls 314, 338, 360 and 462. The cooperating presser roll 474 is carried on a shaft 485 fixed to the left hand end of an arm 486 pivotally mounted to the upper end of a vertical bracket member 488 fixed to the bed of the machine. The roll 474 is maintained constantly in operative position by its own weight and is not raised or lowered as are the other cooperating presser rolls of the machine.

The tax bill is discharged from the cooperating rolls 472 and 474 onto a table 490 of the receiving holder 442, Figs. 1, 3, 7, and 8. The table 490 at its extreme left hand end is provided with a vertical plate 492 against which the leading edge of the tax bill comes to rest. The table 490 is located at substantially the same level as the top surface of the bed 12 of the machine and at its left hand end is supported by a diagonal brace member 494 fixed by suitable machine bolts to the table 490 and at its lower end to the vertical left hand end of the frame 10 of the machine. The right hand end of the table 490 is supported by brackets 496 fixed to the left hand end of the bed 12 of the machine. As shown best in Fig. 3, the forward edge of the supporting table 490 is provided with a pair of rearwardly extending slots or recesses 498 which are arranged to receive pusher fingers 500 for engaging the front edge of the tax bill to move it rearwardly and into engagement with a binding and perforating mechanism as will later be described.

The fingers 500 as shown in front elevation in Fig. 1 are vertically extending portions of strap members 502 which are bent horizontally toward each other and then are again bent at right angles to extend vertically downwardly and in contact with each other. These downwardly extending portions or arms 504 are secured together in any suitable manner forming a pusher frame. The lower ends of the portions 504 are provided with aligned openings to receive a rod or shaft 506 which is mounted in downwardly extending brackets 508 fixed against the lower surface of the supporting table 490. The arms 504 are rotatably mounted on the shaft 506 and are prevented from axial movement by collars 510 which are secured to the shaft 506 by suitable set screws. The arms 504 are also provided with a cam roller 512 which bears against an edge cam 514 fixed on a shaft 516 which is rotatably mounted in suitable bearings formed in the bracket members 508. The cam 514 and its shaft 516 are driven by a sprocket wheel 518 fixed to a shaft 520 rotatably mounted in the lower ends of bracket members 52 which extend downwardly from the lower surface of the supporting table 490. The sprocket wheel 518 drives an endless sprocket chain 524 which surrounds a sprocket wheel 526 fixed to the cam carrying shaft 516. The shaft 520 as will later be described is rotated through connections to the shaft 402.

The tax bill pusher fingers 500 are operated only once for every six printing or addressing operations of the machine on the same address. In other words, two duplicate tax bills and one original tax bill have been removed from the tax bill holder 50 and these three bills have been passed through the printing position and two repetitions of the same address have been applied to each duplicate and to the original bill. Thus the two duplicates and one original have been removed from the tax bill holder 50 and these three bills have been passed through the printing position and two repetitions of the same address have been applied to each of the two duplicates and to the original bill. Thus the two duplicate addressed bills have first been successively delivered one upon the other onto the supporting table 490 with their leading edges aligned by the end wall 492 and then the original addressed bill is deposited on the two duplicate bills.

After the original bill has been deposited in superimposed position on the two duplicate bills, the pusher fingers 500 are moved toward the left, as viewed in Fig. 7, under the influence of a coil tension spring 528 connected at its front end to the vertical arms 504 and at its rearward end to a hook member secured to the under surface of the table 490. At this time, of course, the low spot in the cam 514 is opposite to the cam roll 512. Since the low spot 530 in the cam 514 extends only over a very small portion of the periphery of the cam 514, the fingers 500 are immediately returned to their original position and thus do not interfere with the feeding of successive bills.

The pusher fingers function to align the long edges of the superimposed bills and also to advance the bill collection transversely of its length into the action of a combining and perforating mechanism which acts to combine the three bills into book form.

Said mechanism includes a cooperating set of bill feeding and perforating rolls 532 and 534 that receive between them the right hand part of the bill collection and a set of cooperating feeding and perforating rolls 536, 538 that receive between them the left hand part of the bill collection. The roll 532 is carried by a bracket 533 fixed to the table or bed 12, see Fig. 3. The cooperating feed roll 534 is mounted on a shaft 540 which is located below the rear edge of the supporting table 490 and extends thereacross. The right hand end of the shaft 540 is rotatably mounted in a suitable bearing 542 fixed to the under surface of the supporting table 490.

The shaft 402 drives the shaft 540 continuously during operation of the machine. The right-hand end of the shaft 540 (Figs. 3 and 7) has fixed thereto a sprocket wheel 546 which is driven through a sprocket chain 548 from a sprocket wheel 550 fixed to the left hand end of the shaft 402.

The left hand end part of the shaft 540 is supported in a bearing block 544 fixed to the right hand end of the table 499. Said block 544 has a pair of vertical studs 543 screw-threaded therein on which is vertically slidably mounted an upper bearing block 545 which pivotally supports the upper perforating roll 536. Nuts 547 are threaded on said studs and bear on soft rubber discs 549 located between said nuts and the upper bearing block to exert yielding pressure on the upper bearing block and hence on the upper perforating roll to force it into engagement with the bills. Said roll is provided with a circular series of outstanding perforating teeth 552 in the middle of its periphery which enter between corresponding teeth 553 in the periphery of the lower roll 538 and form a series of indentations in the bills that lock them detachably together in a known manner. Thus by the above described mechanism, the rear edges of the two duplicate tax bills and the original tax bill are received between the rolls 532 and 534 at the right end of the bills and between the combined perforating and feed rolls 536 and 538 at the left hand end, which continues the feed of the bills toward the rear of the machine and into a receiving hopper or holder 554. The teeth 552 of the roll 536 fit into the recess or groove formed in the lower feed roll 538 and perforate the combined tax bills along a line 556 in such a manner that the tax bills are detachably held or interlocked together so that any outer one of the bills may be readily and conveniently removed from the other tax bills.

As the tax bill booklets pass from beneath the rolls just above described, they pass over downwardly curved supporting fingers 558 which guide the booklets to the bottom of the receiving holder 554 from which they may be removed subsequently.

Referring now more particularly to Figs. 1 and 7, the driving connection between the shafts 502 and 529 includes a spur gear 560 on the shaft 502 which meshes with a larger spur gear 562 fixed to the left hand end of the shaft 529 which at its right hand carries the sprocket wheel 513.

The machine is provided with a holder 566, Figs. 2 and 4, of more or less usual construction which is arranged to receive a vertical stack of address printing plates and specifically stencils 568. The mechanism for printing the addresses on the bills which is now about to be described is of the type disclosed in my co-pending application for United States Letters Patent, Serial No. 230,440, filed September 17, 1938. The vertical stencil holder 566 is secured by suitable fastenings to horizontal spaced parallel stencil tracks or guideways 570 which are aligned with the lower portion of the holder 566 and are parallel to and located slightly above the tax bill guideways 128 and 130 and rearwardly of the various upper sheet feed rolls above described. The left hand lower end of the holder 566 is provided with an opening of substantially the same thickness as a stencil frame through which the lowermost stencil in the stack is arranged to pass into the guide tracks 570. The lowermost stencil in the stack is arranged to be engaged by an abutment formed on a reciprocating pusher or pusher plate 572 slidably mounted in the bottom of the holder 566. The right hand end of the pusher 572 is provided with an extension 574 which is pivotally connected to the right hand end of a bent lever 575 which is spaced slightly above and parallel to the top surface of the bed 12 of the machine. The left hand end of the bent lever 575 is pivotally secured to the forward end of a lever arm 576 which also is spaced from the top of the bed 12 of the machine. The rear end of the lever arm 576 is fixed to the top end of a shaft 578 which extends vertically downwardly through the table and through a long vertical bearing member 580 fixed to the under surface of the bed 12 of the machine. The lower end of the shaft 578 has fixed thereto a substantially horizontal lever arm 582, Fig. 2, which extends toward the left and is arranged to enter a cam groove 584 formed in a cam lever 586 pivoted on a horizontally extending shaft 588 rotatably mounted in bearings formed in the lower end of a supporting bracket 590 fixed in any suitable manner to the bed 12 of the machine.

The cam arm or lever 586 is adapted to be reciprocated only once during every six operations of the printing mechanism for the particular bills herein illustrated. To this end, said cam lever 586 is operated by a bell crank lever 592 fixed to the aforesaid shaft 588. The cam lever 586 is provided at its rear end portion with a recess or latch notch 594 which is arranged to be engaged by a projection 595 formed on a latch member 596 carried pivotally on an extension of the bell crank lever 592, which projection is arranged to be held out of the recess 594 thus preventing operative connection between the bell crank lever 592 and the cam arm or lever 586 until a change of addresses is required.

In order to understand more readily the relation of the stencil feeding mechanism to the printing mechanism, it will be advisable at this time to describe briefly the printing mechanism and the mechanism for operating the same. A printing pad 598 is disposed above the stencil track and in the middle thereof and is adapted to be moved downwardly into contact with the stencil in the track and force ink through the printing characters thereof onto a tax bill disposed immediately beneath the stencil track. The pad 598 is mounted in downwardly extending arms 600 which are integral with a horizontally elongated frame 602 which is pivotally mounted on a horizontal shaft 604 mounted in suitable bearings 606 comprising a part of the bracket 590. A platen 608 is disposed beneath the stencil track and the printing pad 598 and is adapted to be raised through openings in the machine bed 12 and through the bill guideway 124 to support the paper sheet or tax bill in position immediately beneath the stencil at the time that the printing pad 598 is moved downwardly to make the impression of the stencil printing characters on the bill. The platen 608 is a fixed part of the forward ends of parallel arms 610 that extend rearwardly, or to the left in Fig. 6 and are thereat pivoted to the bracket 590. The platen 608 is reciprocated by means of an arm 614 forming an upwardly extending arm of the bell crank lever 592. The arm 614 has a cam face 616 which is adapted to ride under a roller 618 journalled on and between the platen arms 610 thus to raise and lower the platen.

The printing pad 598 is also reciprocated by the bell crank lever 592 through a toggle. The frame 602 has a depending arm 620 which carries a screw-threaded extension 622 forming one link of the toggle and which is pivotally connected to the bell crank lever 592 by a second toggle link 625 pivoted at 626 to the bell crank lever. The bell crank lever is reciprocated by means of a connecting rod 628 operated from the jack shaft 28 to the power drive apparatus in a well known manner. It is apparent that when the connecting rod 628 reciprocates, the printing pad 598 and the platen 608 will be reciprocated in timed relation since the bell crank lever 592 is reciprocated during each rotation of the jack shaft.

Since the stencil feed is to be operated only once during every sixth printing operation, means are provided to connect the pusher mechanism with the bell crank lever 592 for operation but once for every six operations of the bell crank lever. To this end, the rearward extension of the bell crank lever 592 has journalled thereon by a stub shaft 630 a cam member 632 which is arranged to engage a cam roll 633 rotatably mounted on the latch member 596 to hold the projection out of the notch 594 formed in the cam lever 586 at times. A ratchet wheel 635 is also mounted on the shaft 630 and rotates to turn conjointly with the cam 632 and is operated by a pawl 634 pivotally mounted on a link 636 which is pivoted at its lower end to the shaft 630 and at its upper end is pivoted to a link 638, the other end of which is pivotally secured to the bracket 594. Thus when the bell crank lever is moved in a clockwise direction, as viewed in Fig. 6, the link 636 is swung in a counter-clockwise direction over one of the teeth on the ratchet wheel 639. When the bell crank lever 592 is swung in a counter-clockwise direction and returned to its initial position, the link 636 is caused to be moved in a clockwise direction and engages one of the teeth to move the ratchet wheel 635 and its associated cam member 632 in a clockwise direction by the distance between adjacent teeth. The ratchet wheel 635 is provided with twelve teeth and the cam member 632 is provided with two diametrically opposed low portions 640. Thus after the ratchet wheel has been rotated a space of six teeth, the cam roll 633 on the latch 596 enters one or the other of the low portions 640 and permits the projection on the latch 596 to enter the notch in the cam lever 586. Thus during the sixth reciprocation of the bell crank lever 592, the cam lever 586 will be rotated therewith thus causing reciprocation of the arm 582 and the arm 576 associated therewith in a counter-clockwise direction, as viewed in Fig. 4, thus moving one stencil out of printing position under the printing pad and the next stencil into printing position.

Ink is supplied to the printing pad 598 by a cylindrical and rotatable ink reservoir 642 carried by pivoted arms 644 and bearing upon the periphery of an axially reciprocable continuously rotating distributing roll 646 which is in driving engagement with the surface of a cylindrical transfer drum 648. Ink from the surface of the transfer drum 648 is conveyed to an inking roll 650 by a series of conveyer rolls 652, 654, 656 journalled on rods 658 extending between and carried by depending arms 660 pivoted to forwardly extending bracket arms 662 by screws 664. The supporting rods for the drums 652 and 654 are loosely mounted in the arms 658 so that roll contact between the conveying rolls is assured.

The uppermost conveyor roll 652 engages the surface of the transfer drum 648 in such a location that the series of conveyor rolls is maintained in the position shown in Fig. 6 in front of the printing arm. On each swinging movement of the ink roll 650 they are brought momentarily into rotating contact with the lowermost conveyor roll 656 which roll supplies ink to the inking rolls.

The arrangement of the printing head is such that if the head swings downwardly about the pivot 604 toward the stencil, the resilient impression pad or printing pad 598 engages the stencil during this movement toward the stencil. The ink roll 650 which is normally maintained in the position shown in Fig. 6 is moved forwardly over the stencil engaging face of the pad 598 by arms fixed to the printing pad carrying frame 602. The printing roll 650 is rotatably mounted in the links 666 which are pivotally secured to the forwardly extending brackets 662 by the aforesaid screws 664. Each link or arm 666 carries thereon a laterally extending boss 668 which is arranged to be engaged by the forward end of a plate 670 fixed to each side of the pivoted printing pad carrying frame 602. Thus, as the pad 598 is moved toward the stencil, the forwardly extending projections on the plates 670 in engagement with the bosses 668 rotate the links 666 about their axes and cause the ink roll 650 to be moved across the face of the printing pad 598. The forward edges of the plates 670 engage the rear surfaces of the bosses 668 so that the inking roll 650 is locked in its forward position during the printing operation and remains in that forward position until after the printing pad 598 begins its return movement. The construction of the inking mechanism is not described in detail herein since the manner of inking the impression pad is not important to the present invention and any suitable mechanism may be employed.

As hereinbefore stated six impressions are made from each stencil and after the sixth impression has been made the stencil feed operating mechanism is again rendered operative to feed another stencil from the bottom of the holder 566. The used stencils pass along the stencil track or guideway to a stencil receiving mechanism of the type shown in the United States Patent No. 1,210,440 granted January 2, 1917, on an application filed in the name of Sterling Elliott.

The stencil receiving mechanism comprises spaced apart upwardly-curved stencil guiding members 674 located above the left hand end of the stencil tracks 570 which constitute a guideway for the stencils. The guideways 674 terminate in a stencil receiver 676 which is mounted above and supported by the guideways 674.

The guideways 674 are so formed as to provide aligned bearings for the previously described shaft 424. Said shaft 424 has fixed thereon a laterally extending forked shifter or elevator member 678 which is arranged to engage the forward edge of the stencils as they are positioned between the guideways 674 and, while moving them upwardly in the guideway, also turning them over into reversed position. The shaft 424 has fixed thereon, at the opposite sides of the guide members 674, a beveled pinion gear 684 which meshes with a similar beveled pinion gear 686, the gears 686 being fixed to the lower ends of vertical shafts formed in bearings formed in bosses 688 in the upper ends of the guideway frames 674. Said shafts terminate in large heads or screw-discs 690 formed with spiral grooves 692 therein. These heads 690 extend into the receiver 676 and support the stencil stack therein and also elevate the successive stencils in the guideway into the bottom of the stack in a manner that need not be further explained herein.

The construction and operation of the present machine has been described in detail but it may be well for a more clear understanding of the invention to review briefly the operation of the machine. The machine is put into operation by depressing the pedal 18 thereby starting the inking mechanism and the various bill feeding wheels into operation. Tax bills are successively removed from the sections 88 of the holder 58 and are moved successively along the tax bill guideway into and out of printing position and into the bill receiving holder 442. After two duplicate and one original tax bill are in superimposed relation in the holder 442, the collection of the three bills is moved rearwardly by the pusher fingers 500 and the cooperating perforating and combining rolls 536 and 538 engage the left hand end of the bill as it is being fed rearwardly, thereby to perforate the three superimposed bills and also to cause them to be detachably secured together. Since there are two addresses on each bill and duplicate it is apparent that six impressions must be made by the printing head 598 for each feeding operation of the pusher member 574. Thus as the sixth printing operation is completed upon a stencil, one of the low spots in the cam member 672 is beneath the cam roll on the latch member 596 which permits the projection thereon to enter the recess 594 in the cam lever 586 thereby actuating the cam lever and the stencil pusher mechanism including the link 574 at the top of the machine bed 12 to shift stencils so that another six printing operations can be effected on three additional bill sheets. The original and the first duplicate bill of the booklet can have carbon deposits on their back faces underlying the parts 386, Fig. 12, so that data applied manually to these parts on the original bill will be duplicated on all duplicate bills.

Having thus described my invention, what I claim as new and desire to secure by Letters Patent of the United States is:

1. In an addressing machine, means for applying addresses to successive articles, a guideway along which the articles are moved successively into addressing position, a holder for a plurality of stacks of articles, and means operative in timed relation with said address applying means for successively transferring the endmost article of the plurality of stacks into said guideway and into and out of addressing position.

2. In an addressing machine, means for applying addresses to successive articles, means for guiding successive articles to the action of said address-applying means, means for supporting a plurality of collections of articles, means for removing successive articles in a predetermined order from the plurality of collections of articles and for presenting them to the action of said guiding means, and means operative on the addressed articles to attach them together in the order in which they were removed from the collections.

3. In a bill addressing machine, addressing mechanism, means for supplying said mechanism with a succession of address-bearing devices, means providing a support for a duplicate bill stack and an original bill stack, means for presenting bills successively from said stacks to the action of said mechanism, and means for attaching addressed bills together in groups each containing an original uppermost bill and a lower duplicate bill.

4. In a bill addressing machine, addressing mechanism, means for supplying said mechanism with a succession of address-bearing devices, means providing a support for a plurality of duplicate bill stacks and original bill stack, means for presenting to the action of said addressing mechanism successive bills in groups consisting of a bill from each of said stacks in succession, operating mechanism for said addressing mechanism operative to apply the same address to all bills of a group and different addresses to different groups, and means separately to attach together the bills of the different groups with the original bill of the group uppermost.

5. In an addressing machine, means for applying addresses to successive articles, a holder for a plurality of stacks of articles to be addressed, a guideway for guiding articles from said holder to said address-applying means, means for transferring articles from said holder to said guideway, said holder being movable in timed relation to the operation of said address-applying means to position the several article stacks thereon successively into cooperative relation with said guideway.

6. In an addressing machine, addressing mechanism, a guideway for guiding successive articles to the action of said mechanism, an article holder arranged to support a plurality of stacks of articles, means operating in timed relation to said addressing mechanism to position a stack for the delivery of an article thereof to said guideway, and means operative following the positioning of said holder to remove the endmost bill of the positioned stack to deliver it to said guideway.

7. In an addressing machine means for applying addresses to successive articles, a holder for a plurality of stacks of articles to be addressed, a guideway along which said articles are moved successively into addressing position, means for feeding successive articles along said guideway into and out of addressing position, and automatically operative means operative to move the article holder in timed relation with said feeding means to bring successive stacks of articles on the holder into alignment in said guideway prior to the operation of said feeding means.

8. In an addressing machine, means for applying addresses to successive articles, a holder having a plurality of spaced sections for supporting stacks of articles to be addressed, a guideway along which said articles are moved into addressing position, means for advancing successive articles along said guideway into and out of addressing position, and automatically operative means operative to move the holder transversely of the guideway in timed relation with said advancing means to bring successive stacks of articles on the holder into alignment with the guideway prior to the operation of said article advancing means.

9. In an addressing machine, means for applying addresses to successive articles, a holder for a plurality of stacks of articles to be addressed, a guideway along which said articles are moved into addressing position, means for feeding successive articles step by step along said guideway into and out of addressing position, and means for moving the article holder step by step to move successive stacks of articles on the holder into alignment with said guideway, said means being operative to return the holder to its initial position in one continuous movement.

10. In an addressing machine, means for applying addresses to successive articles, a holder for a plurality of stacks of articles to be addressed, a guideway along which said articles are moved into addressing position, means for advancing successive articles along said guideway into and out of addressing position, and means operative to move said article holder to bring successive stacks of articles from the holder into alignment with said guideway, said means including mechanism arranged to move said holder step by step in one direction to move successive stacks on the holder successively into alignment with said guideway and arranged upon completion of movement in that direction to return the holder to its initial position in one continuous movement.

11. In an addressing machine, means for applying addresses to successive articles, a holder having a plurality of spaced sections for supporting stacks of articles to be addressed, a guideway along which said articles are moved into addressing position, means for advancing successive articles along said guideway into and out of addressing position, and means operative to move the article holder to bring successive article supporting sections on the holder into alignment with the guideway, said means including a rotatable cam member arranged to move said holder step by step in one direction to bring successive stacks into alignment with said guideway and arranged upon completion of movement in that direction to return the holder to its initial position in one continuous movement.

12. In an addressing machine, means for applying addresses to successive articles, a holder for a plurality of stacks of articles to be addressed, a guideway along which said articles are moved into addressing position, a suction device reciprocable generally in the direction of the guideway arranged to engage the topmost article in the stack aligned with the guideway for moving the topmost article from the stack and into said guideway, feeding means located in said guideway for moving successive articles along the guideway into and out of addressing position, and means operative to move said article holder to bring successive stacks of articles on the holder into alignment with said guideway between successive reciprocating movements of said suction device.

13. In an addressing machine, mechanism for applying addresses to successive articles, a holder having a plurality of spaced sections for supporting stacks of articles to be addressed, a guideway along which said articles are moved into addressing position, means for removing the topmost articles from the stacks on the holder when aligned with said guideway, said last mentioned means being arranged for movement in one direction toward the end of the guideway to move the leading end portion of the article into the guideway, means for feeding successive articles along said guideway into and out of addressing position, and means operative to move the article holder transversely of the guideway step by step to align successive stack supporting sections of the holder with said guideway, said last mentioned means including a cam member having a cam groove therein arranged to impart step by step movement to the article holder in one direction and a continuous movement to the holder in returning the holder to its initial position.

14. In an addressing machine, a holder for supporting a plurality of stacks of articles to be addressed, means for feeding successive articles step by step into addressing position from the successive stacks on the holder, means for applying the same address to a predetermined number of successive articles and different addresses to the succeeding same number of successive articles, a receiver for receiving successive addressed articles in superposed relation to each other, means for securing together a predetermined number of articles, and means operative after said predetermined number of addressed articles bearing the same address have been delivered to the receiver for moving the superposed articles to said securing means.

15. In an addressing machine, a holder for supporting a plurality of stacks of articles to be addressed, means for removing the topmost articles from the stacks on the holder, means for feeding successive articles step by step into addressing position from the successive stacks on said holder, means for applying the same address to a predetermined number of successive articles and different addresses to the succeeding same number of successive articles, a receiver for receiving successive addressed articles in superposed relation to each other, means for securing together a predetermined number of articles, and means operative after said predetermined number of addressed articles bearing the same address have been delivered to the receiver to move the superposed articles to said securing means.

16. In an addressing machine, a holder for supporting a plurality of stacks of articles to be addressed, means for applying the same address to a predetermined number of successive articles, means for removing the topmost articles from successive stacks on the holder, a guideway to which the removed articles are successively delivered, means associated with said guideway for successively feeding the articles in the guideway step by step into and out of addressing position, a receiver for receiving successive addressed articles in superposed relation to each other, means for securing together a predetermined number of articles, and means operative after a predetermined number of addressed articles have been delivered to the receiver for delivering the superposed articles to the action of said securing means.

17. In an addressing machine, a holder for supporting a plurality of spaced stacks of articles to be addressed, means for applying the same address to a predetermined number of articles, means for feeding successive articles step by step into addressing position from the successive stacks on said holder, a receiver for receiving addressed articles in superposed relation to each other, a pair of cooperating rolls for securing together a predetermined number of articles, one of said rolls having radially extending projections entering into recesses formed in the cooperating roll whereby the articles are perforated and detachably held together, and means operative after a predetermined number of addressed articles have been delivered to the receiver for moving the superposed articles toward and into engagement with said cooperating rolls.

18. In an addressing machine, a holder having a plurality of spaced sections for supporting a plurality of stacks of articles to be addressed, means for applying the same address to a predetermined number of successive articles and different addresses to the succeeding same predetermined number of successive articles, means for removing the topmost articles from the stacks in the holder, a guideway to which said articles are delivered, means for feeding successive articles in the guideway step by step into addressing position, means for moving the article holder between successive article removing operations to move different sections into alignment with the guideway, a receiver for receiving successive addressed articles in superposed relation to each other, means for securing together a predetermined number of articles, and means operative after said predetermined number of addressed articles bearing the same address have been delivered to the receiver for moving the superposed articles toward and into engagement with said securing means.

19. In an addressing machine, a holder for supporting a plurality of stacks of articles to be addressed, means for applying the same address to a predetermined number of successive articles, a guideway along which said successive articles are moved into and out of addressing position, means for moving the articles holder step by step to bring successive stacks of articles on the holder into alignment with said guideway, said means being operative also to return the holder to its initial position in one continuous movement, a receiver for receiving successive articles in superposed relation to each other, a pair of cooperating rolls for securing together a predetermined number of articles, one of said rolls having radially extending projections entering into recesses formed in the cooperating roll, whereby the articles are perforated and detachably held together, and means operative after a predetermined number of addressed articles have been delivered to the receiver for moving the superposed articles toward and into engagement with the cooperating securing rolls.

20. In an addressing machine, addressing mechanism, means for presenting a plurality of address-bearing devices to the action of said mechanism, means for changing devices following plural printing operations of said mechanism, means for feeding successive separate address-receiving articles step by step to bring different portions of each of a plurality of articles into and out of the action of said mechanism between changes of said address-bearing devices including sets of intermittently acting feed devices from one to the other set of which an article is advanced, a plural number of article stop devices, and means for operating said feed and stop devices to effect the feeding of an article by one feed device against one stop device and into an inoperative feed device and into position to receive one address and then rendering operative said inoperative feed device to feed the addressed article against another stop device and into position to receive a second address.

21. In an addressing machine, means for advancing a succession of printing devices, printing mechanism operative repeatedly on said devices, separate means intermittently engaging a succession of articles each having a plurality of printing receiving spaces, said means being operative to feed each of a plurality of said articles step by step to locate the successive printing receiving spaces thereon in printing position between advances of said printing devices, and a plurality of stop members arranged successively to engage and to disengage the forward edge of each article as the article is fed respectively into and out of successive printing positions.

22. In an addressing machine, means for advancing a succession of printing devices, printing mechanism operative repeatedly on said devices, a plurality of pairs of cooperating feed rolls intermittently engaging a succession of articles each having a plurality of printing receiving spaces, said pair of feed rolls being operated successively to feed each of a plurality of said articles step by step to locate the successive printing receiving spaces thereof in printing position between advances of said printing devices, and a plurality of stop members arranged successively to engage and to disengage the forward edge of each article as each article is fed respectively into and out of successive printing positions.

23. In an addressing machine, addressing mechanism, means for presenting a plurality of address-bearing devices to the action of said mechanism, means for changing devices following plural addressing operations of said mechanisms, means for advancing successive articles to be addressed repeatedly to the action of said mechanism between changes of said address-bearing devices, including sets of feed rolls and stop members, means for operating one set of feed rolls and a stop member conjointly to feed the article against the stop members and for operating the sets of feed rolls alternately, the sets of rolls being positioned to feed an article to the action of the succeeding set of rolls, the stop members being positioned relatively to each other to position successive parts of the same article in address-receiving relation with said addressing mechanism, and means operative following the application of the last address to remove the plural-addressed article from said addressing mechanism.

24. In an addressing machine, means for advancing a succession of printing devices, printing mechanism operative repeatedly on said devices, a pair of intermittently-operative feed rolls for engaging each article of a succession of articles each having a plurality of printing receiving spaces, said pair of feed rolls being operative on a plurality of said articles between advances of said printing devices and being operative to feed each of said articles to locate the initial printing receiving spaces thereof in printing position, a stop member arranged successively to engage the forward edge of each article as the article is fed into said initial printing position to define such position, a second pair of intermittently-operative feed rolls disposed to engage the successive articles when they are in initial printing position and advance them to locate a subsequent printing space thereof in printing position, a second stop member arranged to engage the forward edge of each article to stop the article in and define such subsequent position thereof, and means to operate said first pair of rolls and first stop member alternately with said second pair of rolls and second stop member.

25. In an addressing machine, means for advancing a succession of printing devices into printing position, printing mechanism operative repeatedly on said devices, a pair of cooperating feed rolls operative on a plurality of articles to be printed between advances of said printing devices, one of said feed rolls being arranged for movement toward and away from the articles to impart intermittent feeding movement to the articles into printing position, a movable stop member arranged to be positioned into the path of movement of the article advanced by said feed rolls to engage the forward end of the article to locate it in one printing position, a second pair of similar feed rolls arranged to receive the article when it is in said one printing position and advance it further, and a second stop member arranged upon the driving movement of the second set of feed rolls to be positioned into the path of movement of the article to engage the forward edge of the article to position the article for a second printing operation thereon.

26. In an addressing machine, addressing mechanism, means for presenting a different address bearing device to the action of said mechanism following a predetermined number of printing operations of said mechanism on a printing device co-acting therewith, means for feeding repetitive sets of sheets to the action of said mechanism, each set consisting of a plurality of different sheets, said feeding means having elements operative to present each sheet of a set to a duplicate action of said printing mechanism on the same address bearing device and all sheets of the set to duplicate action of said mechanism on the same address bearing device, and the sheets of successive sets to the action of said mechanism on different address bearing devices.

27. In an addressing machine, addressing mechanism, means for presenting a different address bearing device to the action of said mechanism following a predetermined number of printing operations of said mechanism on a printing device co-acting therewith, means for feeding repetitive sets of sheets to the action of said mechanism, each set consisting of a plurality of different sheets, said feeding means having elements operative to present each sheet of a set to a duplicate action of said printing mechanism on the same address bearing device and all sheets of the set to duplicate action of said mechanism on the same address bearing device, and the sheets of successive sets to the action of said mechanism on different address bearing devices, and means operative to separately combine and group the sheets of each set.

HARMON PARKER ELLIOTT.